(12) United States Patent
Kim et al.

(10) Patent No.: US 11,769,918 B2
(45) Date of Patent: Sep. 26, 2023

(54) BATTERY MODULE AND MANUFACTURING METHOD THEREOF

(71) Applicant: SK ON CO., LTD., Seoul (KR)

(72) Inventors: Kwan Yong Kim, Daejeon (KR); Tae Gu Lee, Daejeon (KR); Hyeong Kwan Kang, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 17/739,747

(22) Filed: May 9, 2022

(65) Prior Publication Data

US 2022/0263155 A1     Aug. 18, 2022

Related U.S. Application Data

(63) Continuation of application No. 16/295,134, filed on Mar. 7, 2019, now Pat. No. 11,355,797.

(30) Foreign Application Priority Data

Mar. 7, 2018  (KR) ................. 10-2018-0026956
Feb. 28, 2019 (KR) ................. 10-2019-0024173

(51) Int. Cl.
*H01M 10/6555* (2014.01)
*H01M 10/613* (2014.01)
*H01M 10/625* (2014.01)
*H01M 10/653* (2014.01)
*H01M 10/647* (2014.01)
*H01M 50/20* (2021.01)
*H01M 10/658* (2014.01)
*H01M 50/233* (2021.01)
*H01M 50/211* (2021.01)

(52) U.S. Cl.
CPC ...... *H01M 10/6555* (2015.04); *H01M 10/613* (2015.04); *H01M 10/625* (2015.04); *H01M 10/647* (2015.04); *H01M 10/653* (2015.04); *H01M 10/658* (2015.04); *H01M 50/211* (2021.01); *H01M 50/233* (2021.01); *H01M 2220/20* (2013.01)

(58) Field of Classification Search
CPC .......... H01M 10/6555; H01M 10/613; H01M 10/625; H01M 10/653; H01M 10/647
See application file for complete search history.

(56) References Cited

FOREIGN PATENT DOCUMENTS

DE       102012018043 A1     3/2014

OTHER PUBLICATIONS

Office Action for the German Patent Application No. 102019105784.1 issued by the German Patent Office dated Mar. 6, 2023.

*Primary Examiner* — Sarah A. Slifka
(74) *Attorney, Agent, or Firm* — IP & T GROUP LLP

(57) ABSTRACT

The present invention provides a method of manufacturing a battery module, which includes: stacking a plurality of battery cells; applying a thermal conductive member to at least a part of one side of the plurality of battery cells; and bring a cooling plate into contact with the one side of the plurality of stacked battery cells after applying the thermal conductive member, wherein the one side of the plurality of battery cells is an adhesion part which is formed by adhering a case to the electrode assembly on one side except for three sides on which a sealing part is formed by adhering the case among circumferential surfaces of the battery cell in a longitudinal direction thereof.

20 Claims, 9 Drawing Sheets

BATTERY MODULE AND MANUFACTURING METHOD THEREOF

CROSS-REFERENCE TO RELATED APPLICATION

This application is a continuation of U.S. patent application Ser. No. 16/295,134 filed on Mar. 7, 2019, which claims benefits of priority of Korean Patent Application No. 10-2018-0026956 filed on Mar. 7, 2018, and Korean Patent Application No. 10-2019-0024173 filed on Feb. 28, 2019. The disclosure of each of the foregoing application is incorporated herein by reference in its entirety.

BACKGROUND OF THE INVENTION

1. Field of the Invention

The present invention relates to a battery module and a manufacturing method thereof.

2. Description of the Related Art

Research into a rechargeable secondary battery capable of being charged and discharged has been actively conducted in accordance with the development of state-of-the-art fields such as a digital camera, a cellular phone, a laptop computer, a hybrid automobile and the like. In particular, the above-described secondary battery is manufactured in a form of a battery module form by connecting a plurality of cells with each other in series and/or in parallel, and then mounted and used on a high-output hybrid vehicle.

Meanwhile, heat is generated by an electrochemical reaction during charging or discharging of the secondary battery. At this time, if the heat of the battery module is not effectively removed therefrom, a deterioration of the battery module may be accelerated, or safety problems such as ignition or explosion may occur.

Therefore, a configuration of a device capable of cooling the battery module is essential for the secondary battery. Among methods of cooling the battery module, a method of providing a heat sink on one side of a battery module housing to radiate the heat from the high temperature battery module by the heat sink is widely used.

Meanwhile, as a method of increasing a cooling efficiency of the battery module, there has been used a method of increasing a contact force between the battery cells and the housing, in which a thermal conductive sheet or thermal conductive pad is disposed between the battery cells and a cooling plate (housing), as disclosed in Korean Patent Publication No. 10-2017-0098612. However, in this case, it is not possible to cope with a shape of a bottom surface of the battery cell with little or no impact, thereby lowering the cooling efficiency.

When applying a thermal conductive member such as a thermal conductive adhesive instead of the above-described thermal conductive sheet, conventionally, the thermal conductive member is first applied to the cooling plate (housing) that is a counterpart of the battery cell, then the battery cell is placed between, or a predetermined injection port is formed between the battery cell and the cooling plate (housing), and the thermal conductive member is injected through the injection port. However, in this case, since an aspect of applying the thermal conductive member to one side of the battery cell cannot be visually confirmed, it is not possible to cope with the shape of the bottom surface of the battery cell with little or no impact.

Further, when a shape such as a concave groove or the like exists in one surface of the battery cell in which the thermal conductive member is located, an air pocket is generated, thereby also lowering a heat transfer efficiency.

For example, Korean Patent Laid-Open Publication No. 10-2017-0098612 (published on Aug. 30, 2017) discloses a battery module, a battery pack including the battery module and a vehicle including the battery pack, however, it did not solve the above-described problems.

SUMMARY OF THE INVENTION

It is an object of embodiments of the present invention to provide a battery module which may include a thermal conductive member adhered between one surface of a plurality of battery cells and a cooling plate attached thereto without an empty space, thereby increasing a cooling efficiency, and a manufacturing method thereof.

In addition, another object of embodiments of the present invention is to provide a battery module and a manufacturing method thereof, in which, when applying a thermal conductive member between one surface of a plurality of battery cells and a cooling plate, the applied thermal conductive member may be positioned corresponding to a shape of one surface of the battery cells.

Further, another object of embodiments of the present invention is to provide a battery module and a manufacturing method thereof, in which a worker may visually confirm an applying area between processes of applying a thermal conductive member.

Further, another object of embodiments of the present invention is to provide a battery module and a manufacturing method thereof, since it is possible to confirm applying amount and position between processes of applying a thermal conductive member, the thermal conductive member may be applied in a proper amount.

Furthermore, another object of embodiments of the present invention is to provide a battery module and a manufacturing method thereof, which is capable of preventing an air pocket from being generated in a concave groove formed in one surface of a battery cell after applying a thermal conductive member.

To achieve the above-described objects, according to an aspect of the present invention, there is provided a method of manufacturing a battery module, including: stacking a plurality of battery cells; applying a thermal conductive member to at least a part of one side of the plurality of battery cells; and bring a cooling plate into contact with the one side of the plurality of stacked battery cells after applying the thermal conductive member, wherein the one side of the plurality of battery cells is an adhesion part which is formed by adhering a case to the electrode assembly on one side except for three sides on which a sealing part is formed by adhering the case among circumferential surfaces of the battery cell in a longitudinal direction thereof.

The battery cell may include a concave groove formed on one surface thereof by bending at least a part of the adhesion part inward from a surface of the battery cell, and the thermal conductive member may be applied to the concave groove.

The concave groove may be formed along a longitudinal direction of the adhesion part, and the thermal conductive member may be applied along the concave groove.

After disposing the plurality of stacked battery cells in the housing for protecting the other sides except for the adhesion part side among the sides of the plurality of stacked battery cells, the thermal conductive member may be applied.

The thermal conductive member may be applied in a state in which the adhesion part side is positioned on the upper side of the plurality of stacked battery cells.

The applied thermal conductive member may be thinly spread as the cooling plate comes into contact with the adhesion part.

The plurality of battery cells and the cooling plate may be adhered to each other by the thermal conductive member.

According to another aspect of the present invention, there is provided a battery module including: a plurality of battery cells which include electrode tabs, respectively; a cooling plate located corresponding to one side of the plurality of battery cells; and a thermal conductive member located between the one side of the plurality of battery cells and the cooling plate, wherein the one side of the plurality of battery cells is an adhesion part which is formed by adhering a case to the electrode assembly on one side except for three sides on which a sealing part is formed by adhering the case among circumferential surfaces of the battery cell in a longitudinal direction thereof.

Each of the plurality of battery cells may include a concave groove formed on one surface thereof by bending at least a part of the adhesion part inward from a surface of the battery cell.

The thermal conductive member may have adhesiveness and thermal conductivity.

The plurality of battery cells and the cooling plate may be adhered to each other by the thermal conductive member.

The thermal conductive member may be positioned while filling a space between the adhesion part and the cooling plate.

The thermal conductive member may be located between the plurality of battery cells and the cooling plate in a thin film form.

According to the embodiments of the present invention, the thermal conductive member is located between one surface of the plurality of battery cells and the cooling plate attached thereto without an empty space, thereby increasing a cooling efficiency.

Further, according to the embodiments of the present invention, when applying the thermal conductive member between one surface of the plurality of battery cells and the cooling plate, the applied thermal conductive member may be positioned corresponding to a shape of one surface of the battery cells.

Further, according to the embodiments of the present invention, a worker may visually confirm an applying area between processes of applying the thermal conductive member.

In addition, according to the embodiments of the present invention, it is possible to confirm applying the amount and position between processes of applying the thermal conductive member, such that the thermal conductive member may be applied in a proper amount.

In addition, according to the embodiments of the present invention, it is possible to prevent an air pocket from being generated in a concave groove formed in one surface of the battery cell after applying the thermal conductive member.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1A:
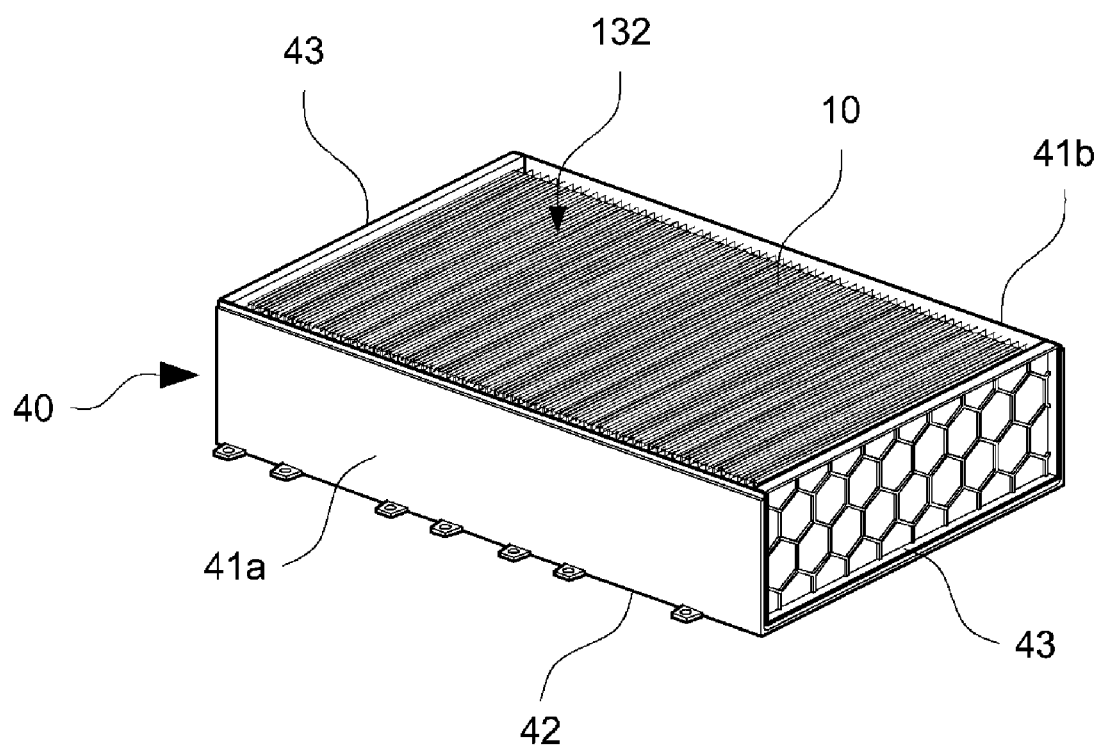
FIG. 1A is a perspective view illustrating a state in which one surface of a plurality of battery cells contained in a housing is located on an upper side according to an embodiment of the present invention.

Hereinafter, specific embodiments of the present invention will be described with reference to the accompanying drawings. However, these are merely illustrative examples and the present invention is not limited thereto.

In descriptions of the embodiments of the present invention, publicly known techniques that are judged to be able to make the purport of the present invention unnecessarily obscure will not be described in detail. Referring to the drawings, wherein like reference characters designate like or corresponding parts throughout the several views. In addition, the terms as used herein are defined by taking functions of the present disclosure into account and can be changed according to the custom or intention of users or operators. Therefore, definition of the terms should be made according to the overall disclosure set forth herein.

It should be understood that the technical spirit and scope of the present invention are defined by the appended claims, and the following embodiments are only made to efficiently describe the present invention to persons having common knowledge in the technical field to which the present invention pertains.

Figure 1B:
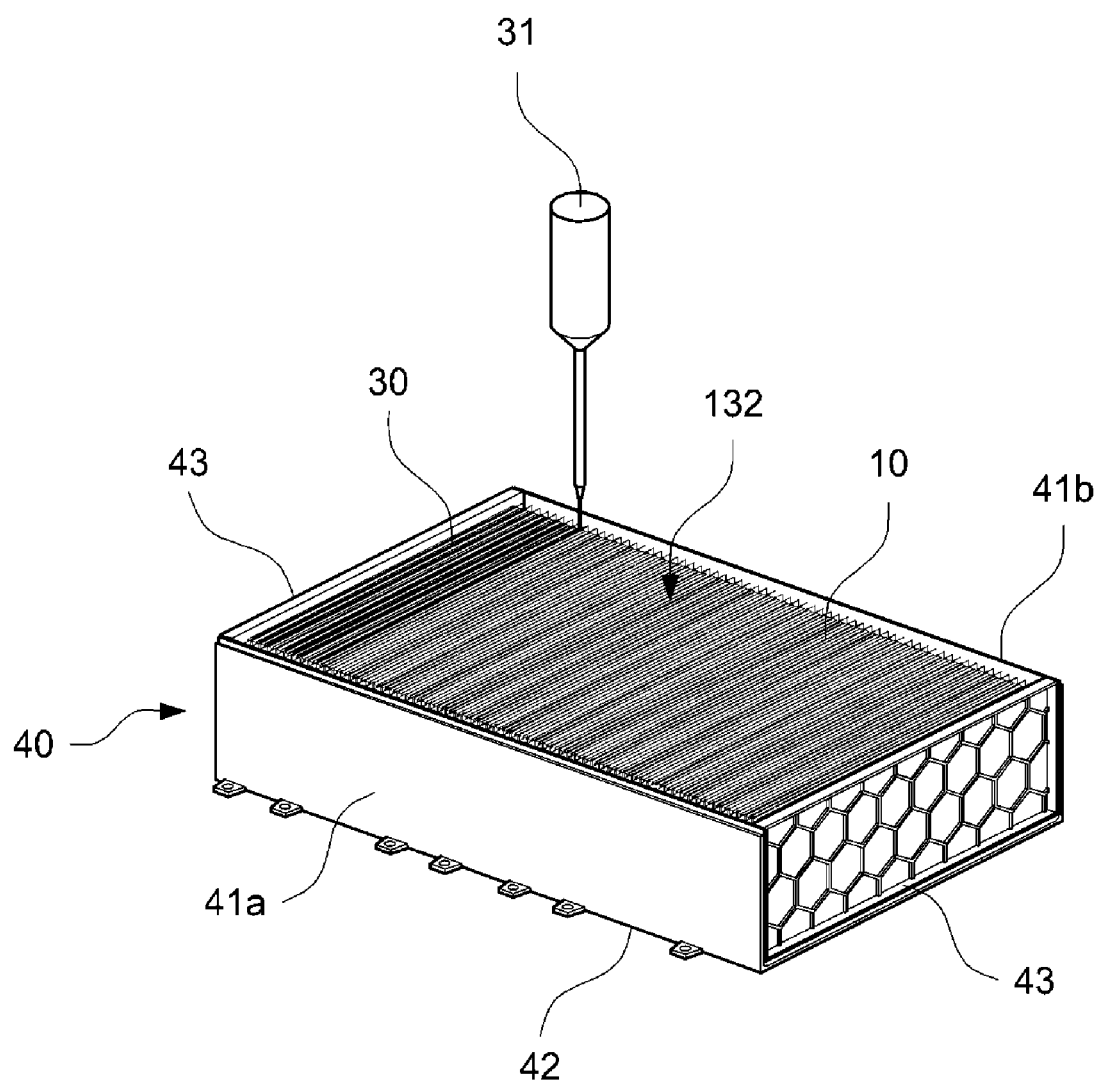
FIG. 1B is a perspective view illustrating a state in which a thermal conductive member is applied to one surface of the plurality of battery cells according to the embodiment of the present invention.
Figure 1C:
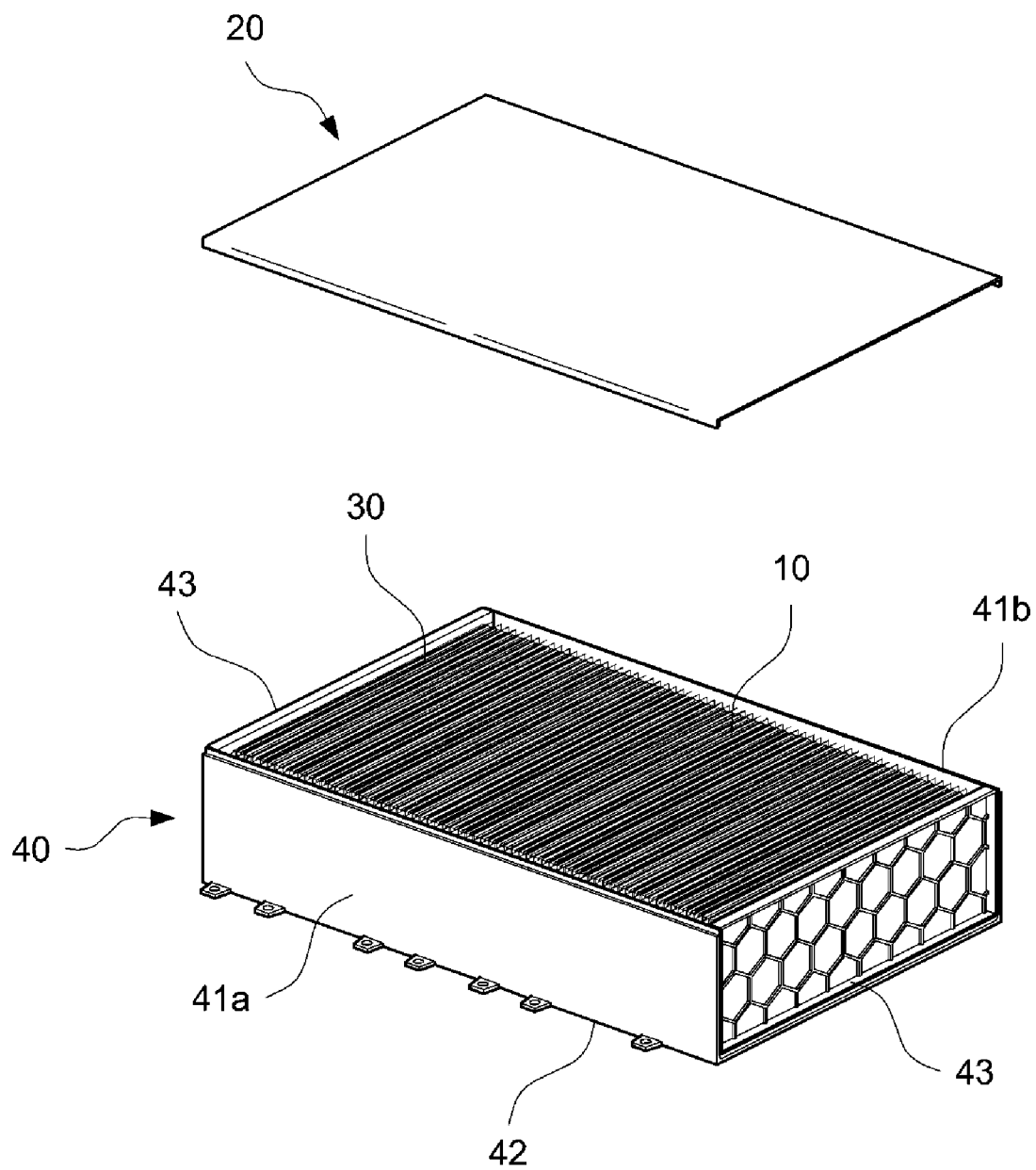
FIG. 1C is a perspective view illustrating a state in which a cooling plate comes into contact with the one surface of the plurality of battery cells applied with the thermal conductive member according to the embodiment of the present invention.
Figure 2:
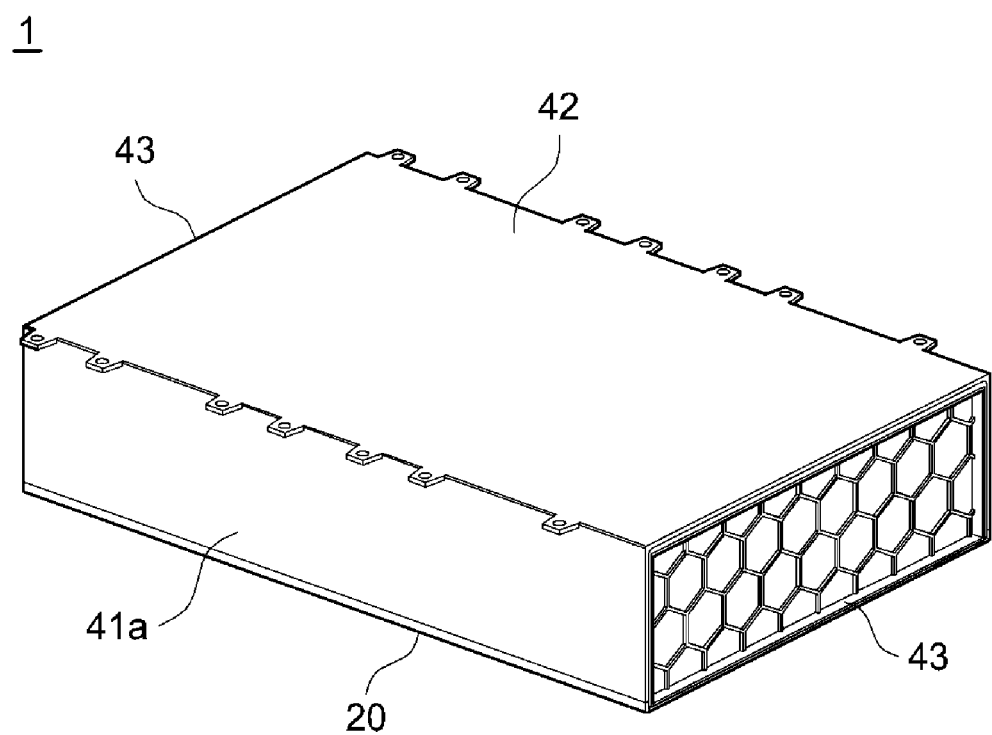
FIG. 2 is a perspective view illustrating a battery module manufactured according to the embodiment of the present invention.

FIG. 1A is a perspective view illustrating a state in which one surface of a plurality of battery cells 10 contained in a housing 40 is located on an upper side according to an embodiment of the present invention, FIG. 1B is a perspective view illustrating a state in which a thermal conductive member 30 is applied to one surface of the plurality of battery cells 10 according to the embodiment of the present invention, FIG. 1C is a perspective view illustrating a state in which a cooling plate 20 comes into contact with the one surface of the plurality of battery cells 10 applied with the thermal conductive member 30 according to the embodiment of the present invention, and FIG. 2 is a perspective view illustrating a battery module 1 manufactured according to the embodiment of the present invention.

Referring to FIGS. 1A to 1C, and FIG. 2, according to the embodiment of the present invention, first, a plurality of battery cells 10 are stacked, then a thermal conductive member 30 may be applied to at least a part of one side of the plurality of stacked battery cells 10. Thereafter, the cooling plate 20 comes into contact with one side of the plurality of battery cells 10 to which the thermal conductive member 30 is applied, such that a battery module 1 may be manufactured.

At this time, the one side of the battery cell 10 may be an adhesion part 132 which is formed by adhering a case 13 to the electrode assembly 11 on one side except for three sides on which a sealing part 131 is formed by adhering the case 13 among circumferential surfaces of the battery cell 10 in a longitudinal direction d1 (illustrated in FIG. 3) thereof, and a thermal conductive member 30 is applied to at least a part of the adhesion part 132, then the cooling plate 20 may come into contact with the adhesion part 132. At this time, the longitudinal direction d1 of the battery cell 10 may referred to a direction in which electrode tabs 12 of the battery cell 10 protrude as illustrated in FIG. 1A. The case 13 could be aluminum laminated film for battery.

Further, the above-described battery cell 10 may include a concave groove 133 formed on one surface thereof by bending at least a part of the adhesion part 132 inward from a surface of the battery cell 10, and the above-described thermal conductive member 30 may be applied to the concave groove 133 of the plurality of stacked battery cells 10.

Accordingly, unlike a case in which the plurality of stacked battery cells 10 are placed on the cooling plate 20 after applying the thermal conductive member 30 to the cooling plate 20, in the battery module 1 manufactured according to the embodiment of the present invention, the thermal conductive member 30 is first applied to the concave groove 133 formed on one surface of the plurality of battery cells 10, then the cooling plate 20 comes into contact with the one surface of the above-described battery cells 10. Therefore, it is possible to prevent an occurrence of an air pocket which may be generated in a space between the concave groove 133 and the cooling plate 20 after being in contact with the cooling plate 20. Thereby, a contact force between the battery cells 10 and the cooling plate 20 may be increased, and a heat transfer efficiency from the battery cell 10 to the cooling plate 20 may be maximized.

More specifically, the above-described concave groove 133 may be formed along the longitudinal direction d1 of the adhesion part 132 on one surface of the battery cell 10, and the thermal conductive member 30 may be applied along the longitudinally formed concave groove 133. At this time, the above-described thermal conductive member 30 may be applied along the concave groove 133 in a long straight line shape. That is, when applying the thermal conductive member 30, the thermal conductive member 30 is not widely applied over an entire surface of the adhesion part 132, but is longitudinally applied along the concave groove 133 in a straight line. Therefore, it is possible to apply the thermal conductive member 30 only to the required portion of the adhesion part 132 on one surface of the battery cell 10, and thereby, the thermal conductive member 30 may be applied in a proper amount.

Further, according to the embodiment of the present invention, after the battery cells 10 are disposed in the housing 40 of the battery module 1, the above-described thermal conductive member 30 may be applied. At this time, the above-described housing 40 may include a front cover 41a and a rear cover 41b, which are located on respective sides in the longitudinal direction d1 of the plurality of stacked battery cells 10, side covers 43 located on both sides in a stacking direction of the plurality of battery cells 10, and a top cover 42 located on a side opposite to one surface of the battery cell 10 on which the adhesion part 132 is formed.

That is, after disposing the plurality of stacked battery cells 10 in the housing 40 for protecting the other sides except for the side on which the adhesion part 132 among the sides of the plurality of stacked battery cells 10, the thermal conductive member 30 may be applied.

Meanwhile, the front cover 41a, the rear cover 41b, the side covers 43 and the top cover 42 described above may be coupled with each other by welding or the like, and may be located outside the plurality of stacked battery cells 10. Then, it is possible to support a stacked structure of the plurality of battery cells 10, and protect the battery cell 10 from external foreign matters, impact, and the like applied thereto.

The method of manufacturing the battery module 1 according to the embodiment of the present invention, in which all the front cover 41a, the rear cover 41b, the top cover 42 and the side covers 43 are coupled with each other, then the thermal conductive member 30 is applied to the upper surface of the battery cell 10, has been described above, but it is not limited thereto, and any method may be used so long as the plurality of stacked battery cells 10 can be supported by at least one of the above-described covers 41a, 41b, 42 and 43, for example, the thermal conductive member 30 is applied to the upper surface of the battery cell 10 in a state in which only the side covers 43 and the top cover 42 are coupled with each other.

Further, the thermal conductive member 30 may be applied in a state in which the adhesion part 132 side of the plurality of stacked battery cells 10 is positioned on the upper side of the plurality of stacked battery cells 10. That is, the plurality of battery cells 10 are stacked, and the adhesion parts 132 of the stacked battery cells 10 are positioned so as to be arranged on the upper side, then the thermal conductive members 30 may be applied to the concave grooves 133 on the adhesion parts 132.

As described above, the concave groove 133, to which the thermal conductive member 30 is to be applied, is positioned on the upper side of the plurality of stacked battery cells 10, and the one surface of the battery cell 10 having the adhesion part 132 formed therein is positioned parallel to a paper surface. Therefore, a worker may easily and visually confirm the application position, the applying state, and the like between the processes of applying the thermal conductive member 30. Further, it is possible to prevent the thermal conductive member 30 from being flowed down by the gravity or being concentrated to one side during applying the thermal conductive member 30.

Meanwhile, as the cooling plate 20 comes into contact with the adhesion part 132, the thermal conductive member 30 applied as described above may be thinly spread between the plurality of battery cells 10 and the cooling plate 20. Specifically, as the cooling plate 20 comes into contact with the adhesion part 132 of the plurality of battery cells 10, the thermal conductive member 30 applied to the concave groove 133 may be pressed and thinly spread, and the thermal conductive member 30 may be spread corresponding to a shape of the adhesion part 132. Therefore, it is possible to minimize an empty space between the adhesion part 132 of the battery cell 10 and the cooling plate 20.

At this time, as described above, after the plurality of stacked battery cells 10 are disposed in the housing 40, the thermal conductive member 30 may be applied. In this case, the cooling plate 20 may be bonded to at least a part of the housing 40 by welding or the like with being in contact with the adhesion part 132. That is, the battery module 1 may be manufactured by coupling the cooling plate 20 with at least one of the side covers 43, the front cover 41a and the rear cover 41b.

Further, the manufactured battery module 1 may be used by turning over to 180 degrees after completion. Specifically, after the battery module 1 is disposed so that the top cover 42 is positioned on the upper side and the cooling plate 20 is positioned on the lower side, the battery module 1 may be used with the cooling plate 20 side being in contact with a heat sink (not illustrated), or the like below the battery module 1.

As described above, in the method of manufacturing the battery module 1 according to the embodiment of the present invention, the thermal conductive member 30 is applied to the concave groove 133, and then pressed to be adhered. Therefore, an occurrence of an air pocket due to the shape of the concave groove 133 during contacting the cooling plate 20 may be prevented.

Meanwhile, the above-described thermal conductive member 30 may have adhesive force and thermal conductivity. At this time, preferably, the thermal conductive member 30 has a thermal conductivity of 1 to 3 W/mK, such that the cooling efficiency of the battery cell 10 through the cooling plate 20 may be increased. The thermal conductive member 30 may include a resin layer such as a thermal adhesive including a filler having heat transfer performance.

Furthermore, the battery module 1 according to the embodiment of the present invention may not require a separate adhesive for bonding the plurality of battery cells 10 and the cooling plate 20. Specifically, the above-described thermal conductive member 20 may have a predetermined adhesive strength, that is, a tensile strength of 5 to 10 MPa, a shear strength of 6 to 15 MPa, and a peel strength of 500 to 1000 Kgf. Thereby, even if an external impact or the like is applied thereto, the bonding state between the battery cells and the cooling plate 20 is not easily broken while reliably maintaining the connection state therebetween.

Specifically, the thermal conductive member 30 may be made of a material capable of increasing the adhesive force between the plurality of battery cells 10 and the cooling plate 20 and enhancing a heat radiation effect of the battery cells 10, and is preferably made of a thermally conductive adhesive based on a material selected from the group consisting of acrylic, urethane, epoxy and silicon resins.

Meanwhile, the thermal conductive member 30 may be made of a flame retardant material having a flame retardant grade of V0, such that even in a case of ignition of the battery cell 10 etc., a damage due to fire may be minimized.

In addition, the thermal conductive member 30 may be made of an insulation material, and preferably has a dielectric strength of 10 to 25 kV/mm. As a result, the possibility of electrical communication between the plurality of battery cells 10 and the cooling plate 20 may be blocked.

Furthermore, the thermal conductive member 30 has a sufficient pot life of 10 to 100 min, such that the worker may easily apply the thermal conductive member 30.

In addition, as described above, in the method of manufacturing the battery module 1 according to the embodiment of the present invention, after applying the thermal conductive member 30 to one surface of the plurality of battery cells 10, the cooling plate 20 comes into contact with one surface of the plurality of battery cells 10. Therefore, the worker may visually identify the application area between processes of applying the thermal conductive member 30.

Further, an applying amount of the thermal conductive member 30 and an applying section may be easily controlled between the processes of applying the thermal conductive member 30, and thus the thermal conductive member 30 may be applied only to the required section. Therefore, the thermal conductive member 30 may be applied in a proper amount. That is, by the contact between the plurality of battery cells 10 and the cooling plate 20, the thermal conductive member 30 may be applied to one surface of the battery cell 10 in a minimum amount to an extent of capable of being widely spread.

Figure 3A:
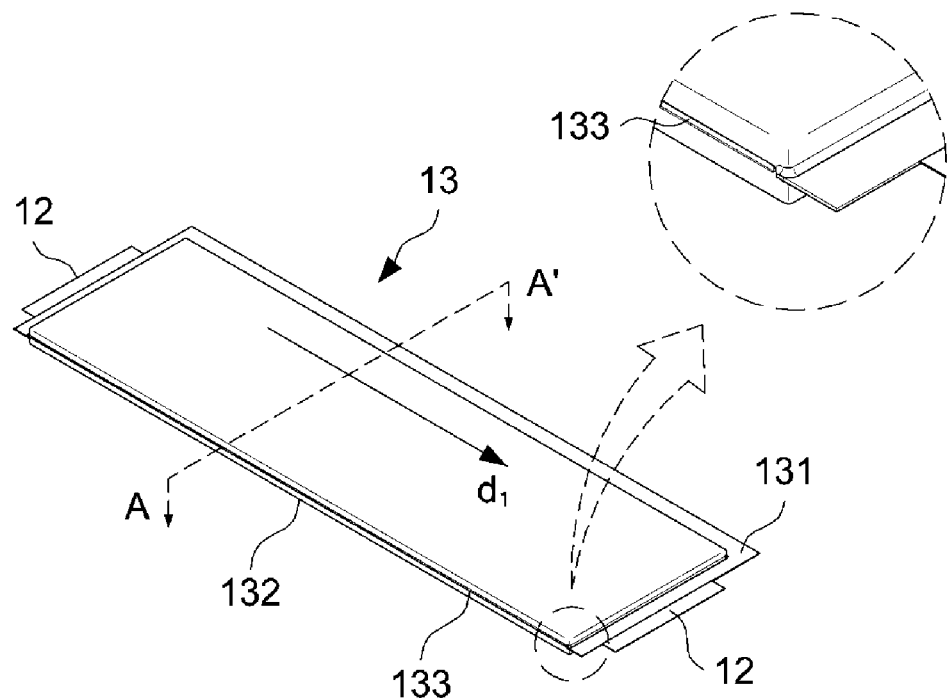
FIG. 3A is a perspective view and a partial enlarged view of a battery cell included in the battery module manufactured according to the embodiment of the present invention.
Figure 3B:
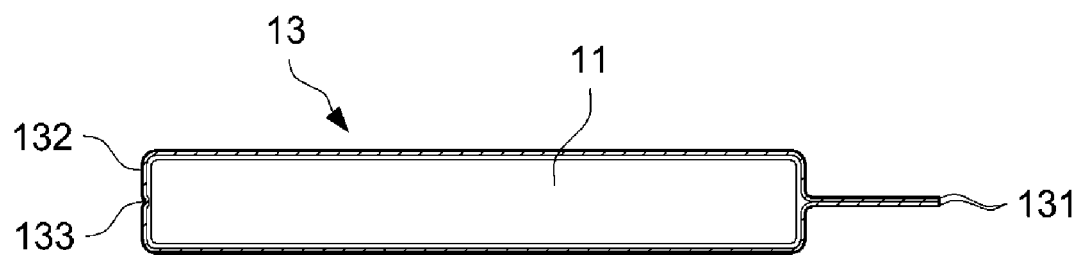
FIG. 3B is a cross-sectional view taken on line A-A' of the battery cell shown in FIG. 2.

FIG. 3A is a perspective view and a partial enlarged view of the battery cell 10 included in the battery module 1 manufactured according to the embodiment of the present invention, and FIG. 3B is a cross-sectional view taken on line A-A' of the battery cell 10 shown in FIG. 2.

In order to describe the configuration of the above battery cell 10 in detail, referring to FIGS. 3A and 3B, first, the battery cell 10 may include the electrode assembly 11 from which the electrode tabs 12 are drawn, and the case 13 surrounding the electrode assembly 11. The case 13 may include a sealing part 131 formed by adhering the case 13 on three sides among four sides of the circumferences in the longitudinal direction d1 of the battery cell 10, and the adhesion part 132 formed by adhering the case 13 to the electrode assembly 11 on a side other than the three sides. The case 13 may include a pouch including an aluminum layer having insulating properties.

Specifically, the sealing part 131 may be formed by adhering the case 13 along outer peripheries of the electrode assembly 11. The sealing part 131 is formed by adhering the case 13, and may be formed along three surfaces except for the adhesion part 132 of the side circumferences of the case 13. At this time, the electrode tabs 12 may be drawn to an outside of the sealing part 131 at both ends of the electrode assembly 11.

In addition, the above-described battery cell 10 may include the concave groove 133 formed on one surface thereof by bending at least a part of the adhesion part 132 inward from the surface of the battery cell 10. In the concave groove 133, since the electrode assembly 11 and the case 13 are in close contact with each other, heat transfer between the electrode assembly 11 and the case 13 may be more efficiently performed, and the battery cells 10 may be more effectively cooled.

FIGS. 4 to 6 are enlarged cross-sectional views for the convenience of description, which illustrate a process of manufacturing the battery module 1 according to the embodiment of the present invention.

Figure 4A:
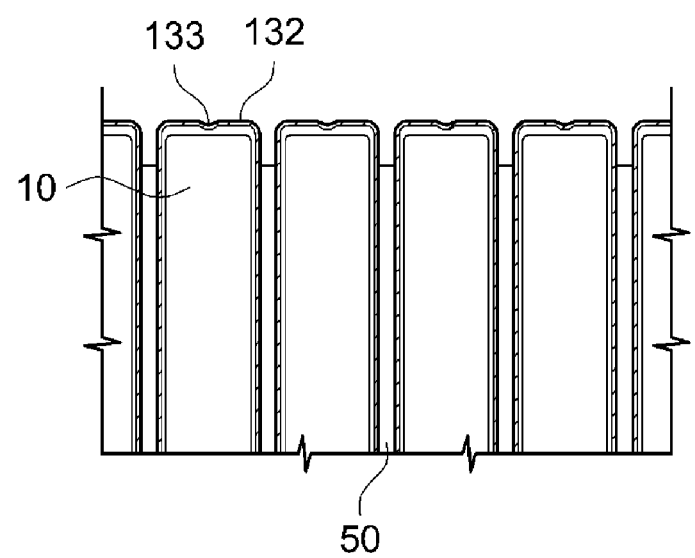
FIG. 4A is an enlarged cross-sectional view schematically illustrating a state in which a plurality of battery cells are stacked according to the embodiment of the present invention without internal components.
Figure 4B:
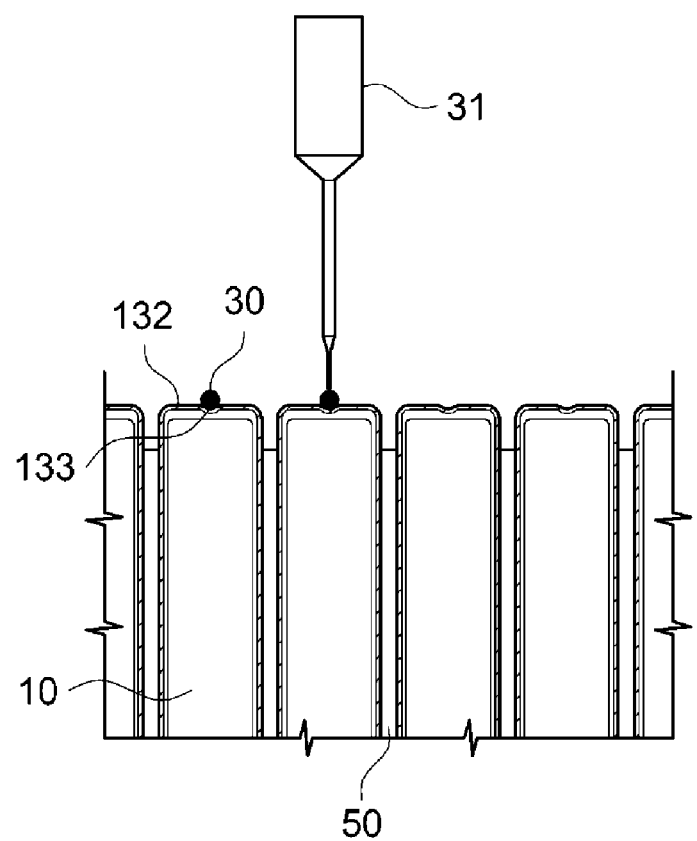
FIG. 4B is an enlarged cross-sectional view illustrating a state in which the thermal conductive member is applied to concave grooves of the plurality of stacked battery cells according to the embodiment of the present invention.
Figure 5A:
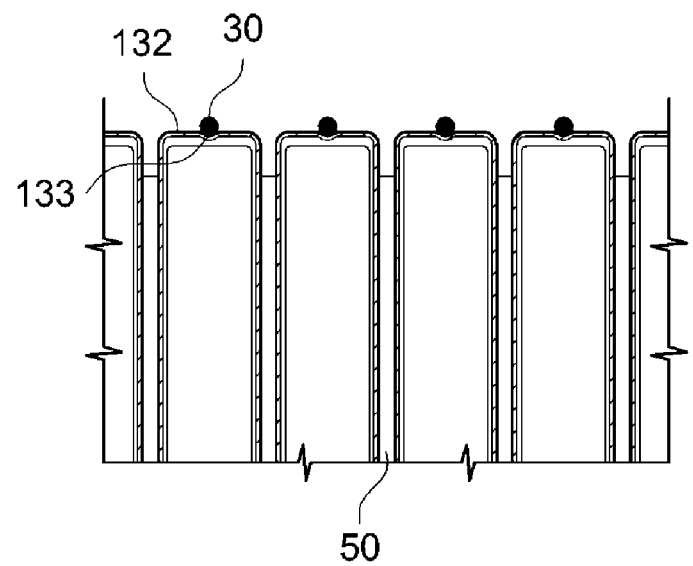
FIG. 5A is an enlarged cross-sectional view illustrating a state in which all thermal conductive members are applied to the concave grooves of the plurality of stacked battery cells according to the embodiment of the present invention.
Figure 5B:
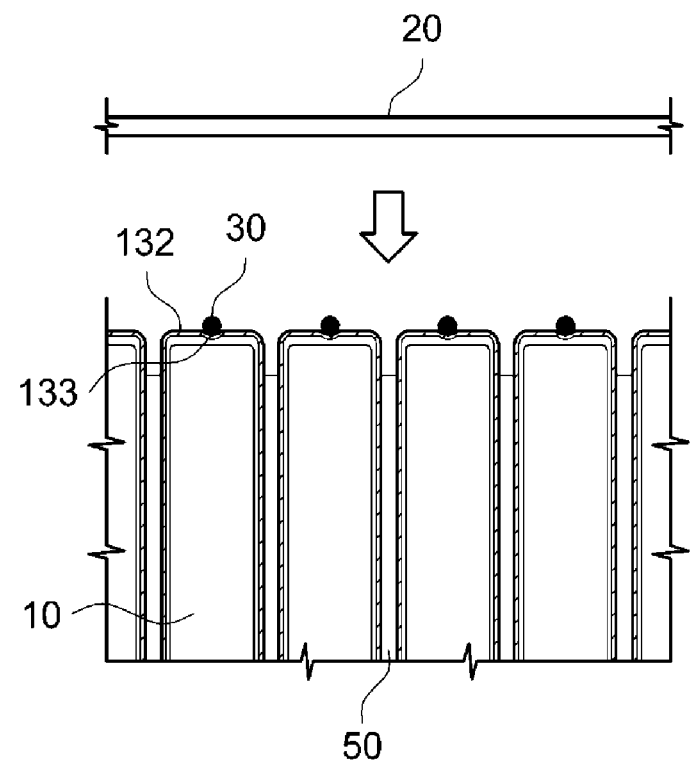
FIG. 5B is an enlarged cross-sectional view illustrating a state in which the cooling plate comes into contact with one surface of the battery cells to which the thermal conductive member is applied according to the embodiment of the present invention.
Figure 6A:
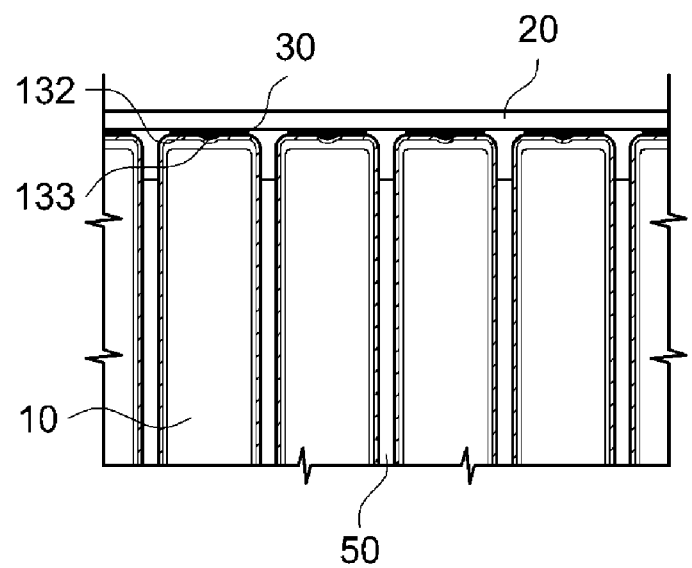
FIG. 6A is an enlarged cross-sectional view illustrating a state in which the cooling plate is in contact with the one surface of the plurality of battery cells according to the embodiment of the present invention.
Figure 6B:
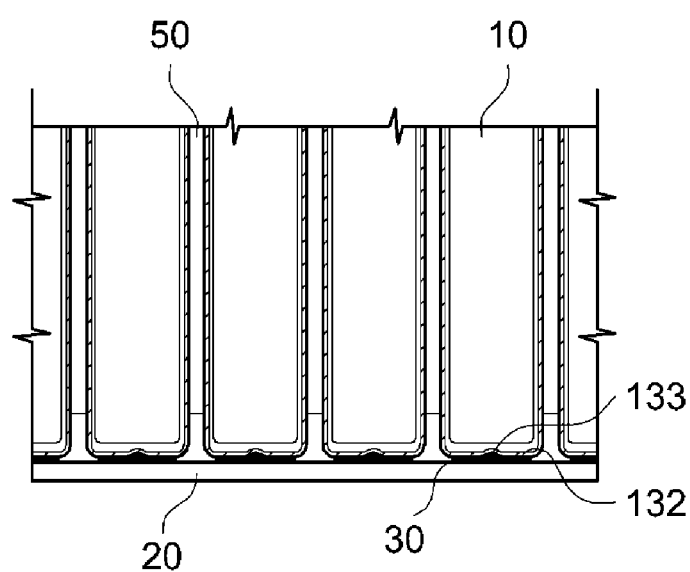
FIG. 6B is an enlarged cross-sectional view illustrating a state in which the plurality of battery cells in contact with the cooling plate are turned over to 180 degrees according to the embodiment of the present invention.

Specifically, FIG. 4A is an enlarged cross-sectional view schematically illustrating a state in which the plurality of stacked battery cells 10 are stacked according to the embodiment of the present invention without internal components, and FIG. 4B is an enlarged cross-sectional view illustrating a state in which the thermal conductive member 30 is applied to concave grooves 133 of the plurality of stacked battery cells 10 according to the embodiment of the present invention. FIG. 5A is an enlarged cross-sectional view illustrating a state in which all thermal conductive members 30 are applied to the concave grooves 133 of the plurality of stacked battery cells 10 according to the embodiment of the present invention, and FIG. 5B is an enlarged cross-sectional view illustrating a state in which the cooling plate 20 comes into contact with one surface of the battery cells 10 to which the thermal conductive member 30 is applied according to the embodiment of the present invention. FIG. 6A is an enlarged cross-sectional view illustrating a state in which the cooling plate 20 is in contact with the one surface of the plurality of battery cells 10 according to the embodiment of the present invention, and FIG. 6B is an enlarged cross-sectional view illustrating a state in which the plurality of battery cells 10 in contact with the cooling plate 20 are turned over to 180 degrees according to the embodiment of the present invention.

Referring to FIGS. 4 to 6, first, as illustrated in FIG. 4A, the plurality of battery cells 10 are stacked, and the plurality of stacked battery cells 10 may be disposed so that the adhesion part 132 are positioned on the upper side. At this time, the battery cell 10 may include the concave groove 133 formed thereon by bending at least a part of the adhesion part 132 inward from the surface of the battery cell 10.

In addition, in the stacked structure of the plurality of battery cells 10, elastic members 50 may be installed between the stacked battery cells 10. The above-described elastic member 50 may buffer swelling of the battery cell 10 due to thermal expansion, and may prevent the external impact and vibration from being transmitted to the battery cell 10. However, the elastic member 50 is not limited to the configuration of being disposed between the battery cells 10, as illustrated in FIGS. 4 to 6, but may be disposed between two bundles of the battery cells 10, or between three bundles of the battery cells 10, for example, by selecting the number of the battery cells 10, as necessary.

Meanwhile, after the plurality of battery cells 10 are stacked, the thermal conductive member 30 may be applied to the concave groove 133 on the upper side of the battery cell 10, as illustrated in FIG. 4B. At this time, the thermal conductive member 30 may be applied through a nozzle 31 or the like that can apply in a specific section, and control the applying amount of adhesive. Furthermore, the thermal conductive member 30 is applied in a state in which the adhesion part 132 is disposed on the upper side of the battery cell 10. Therefore, the applying state of the thermal conductive member 30 may be visually confirmed by the worker during the applying process, such that it is possible to easily control the applying amount of the heat transfer member 30 and the applying section to which the heat transfer member 30 is applied.

The thermal conductive member 30 may be applied to the adhesion part 132 so as to have a weight per area ($g/cm^2$) in a range of 0.15 to 0.25. The thermal conductive member 30 may be thinly and uniformly spread on the adhesion part 132 around the concave groove 133. In addition, as described above, the thermal conductive member 30 may have a predetermined adhesiveness of the tensile strength, shear strength, and peel strength, such that the thermal conductive member 30 may be applied to the adhesion part 132 so as to have a weight per area ($g/cm^2$) of 0.15 to 0.25 in consideration of the viscosity thereof. Preferably, the thermal conductive member 30 is applied to the adhesion part 132 so as to have a weight per area ($g/cm^2$) of 0.15 to 0.25.

If the thermal conductive member 30 has a weight per area ($g/cm^2$) exceeding 0.25, it is difficult to precisely adhere the cooling plate 20 and the adhesion part 132 since the adhesive layer is thickened. If the thermal conductive member 30 has a weight per area ($g/cm^2$) less than 0.15, the adhesiveness between the above two components may be decreased.

When applying the thermal conductive member 30 to the concave groove 133, it may be applied so that an upper surface thereof is formed in a circular or elliptical shape. That is, the thermal conductive member 30 applied to the concave groove 133 may have an upper curved surface protruding from the adhesion part 132. The curved surface may include a circular curved surface or elliptic curved surface. Due to the above-described configuration, during a subsequent process, when the cooling plate comes into contact with and is pressed to the thermal conductive member 30, the thermal conductive member 30 may be uniformly spread between the cooling plate 20 and the thermal conductive member 30 without an occurring of an air pocket therebetween.

Meanwhile, as illustrated in FIG. 5, when the application of the thermal conductive member 30 to the concave groove 133 is completed, the cooling plate 20 may come into contact with the adhesion part 132 side of the plurality of stacked battery cells 10. Thereafter, as illustrated in FIG. 6A, as the cooling plate 20 and the adhesion part 132 come into contact with each other, the thermal conductive member 30 applied to the concave groove 133 may be pressed to be thinly spread between the cooling plate 20 and the adhesion part 132, and specifically, may be formed in a thin film form. That is, the thermal conductive member 30 applied to the concave groove 133 is provided so as to be uniformly spread on the adhesion part 132 in a thin film form as it is pressed by the cooling plate 20.

Further, as described above, after applying the thermal conductive member 30 to the concave groove 133, the cooling plate 20 comes into contact therewith. Therefore, it is possible to prevent an occurrence of air pocket, or the like which may be generated due to the shape of the concave groove 133, and the cooling efficiency of the battery module 1 may be increased.

Finally, after the cooling plate 20 is in contact with the battery cells 10, the battery module 1 may be positioned with being turned over to 180 degrees. In addition, as the plurality of battery cells 10 are positioned on the upper side of the cooling plate 20, the contact force between the battery cells 10 and the cooling plate 20 may be increased due to the gravity, and the battery module 1 may be cooled by the heat sink provided below the cooling plate 20.

Meanwhile, a battery module 1 according to another embodiment of the present invention may include a plurality of battery cells 10 which include electrode tabs 12 respectively, a cooling plate 20 located corresponding to one side of the plurality of battery cells 10, a thermal conductive member 30 located between the one side of the plurality of battery cells 10 and the cooling plate 20.

At this time, the one side of the plurality of battery cells 10 may be the adhesion part 132 which is formed by adhering the case 13 to the electrode assembly 11 on one side except for three sides on which the sealing part 131 is formed by adhering the case 13 among circumferential surfaces of the battery cell 10 in the longitudinal direction thereof.

In addition, each of the plurality of battery cells 10 may include the concave groove 133 formed by bending at least a part of the adhesion part 132 inward from the surface of the battery cell 10, and the thermal conductive member 30 may be positioned while filling the entire space between the plurality of battery cells 10 and the cooling plate 20.

That is, the thermal conductive member 30 may fully fill the space between the adhesion part 132 of the plurality of battery cells 10 and the cooling plate 20 without a gap such as an air pocket, or the like which may be generated in the concave groove 133 of the battery cell 10, such that the space may be minimized, and the cooling efficiency of the plate 20 for the battery cells 10 may be increased.

Meanwhile, as described above, the thermal conductive member 30 between the plurality of battery cells 10 and the cooling plate 20 may have adhesiveness and thermal conductivity. Further, the plurality of battery cells 10 and the cooling plate 20 are adhered to each other by the thermal conductive member 30. In addition, the thermal conductive member 30 is located between the plurality of battery cells 10 and the cooling plate 20 in a thin film form, such that the contact surface between the plurality of battery cells 10 and the cooling plate 20 may be maximized.

Although the representative embodiments of the present invention have been described in detail, it will be understood by persons who have a common knowledge in the technical field to which the present invention pertains that various modifications and variations may be made therein without departing from the scope of the present invention. Accordingly, the scope of the present invention should not be limited to the above-described embodiments, but be defined by the appended claims as well as equivalents thereof.

DESCRIPTION OF REFERENCE NUMERALS

1: Battery module
10: Battery cell
11: Electrode assembly
12: Electrode tab
13: Case
131: Sealing part
132: Adhesion part
133: Concave groove
20: Cooling plate
30: Thermal conductive member
31: Nozzle
40: Housing
41a: Front cover
41b: Rear cover
42: Top cover
43: Side cover
50: Elastic member
d1: Longitudinal direction of battery cell

What is claimed is:

1. A method of manufacturing a battery module, comprising:
   stacking a plurality of battery cells in a front-back direction, each battery cell having a front surface, a rear surface, and four sides, and including a case enclosing an electrode assembly to form a close contact part on one side of the four sides;
   applying a thermal conductive member on the close contact part of each battery cell; and
   placing a cooling plate on the one side of the plurality of battery cells, the cooling plate forming a first surface being flat and facing the one side of the plurality of battery cells,
   wherein the case includes a pouch forming the close contact part on a single sheet of the pouch.

2. The method of manufacturing a battery module according to claim 1, wherein the battery cell includes a concave groove extending along a longitudinal direction of the contact part.

3. The method of manufacturing a battery module according to claim 2,
   wherein the thermal conductive member is applied along the concave groove.

4. The method of manufacturing a battery module according to claim 1, further comprising: disposing the plurality of the battery cells in a housing before applying the thermal conductive member.

5. The method of manufacturing a battery module according to claim 4, wherein the thermal conductive member is applied in a state in which the close contact part is positioned on an upper side of the plurality of the battery cells.

6. The method of manufacturing a battery module according to claim 1, wherein the applied thermal conductive member is spread as the cooling plate comes into contact with the close contact part.

7. The method of manufacturing a battery module according to claim 1, wherein the plurality of the battery cells and the cooling plate are adhered to each other by the thermal conductive member.

8. The method of manufacturing a battery module according to claim 1, further comprising: disposing an elastic member between two adjacent battery cells of the plurality of battery cells.

9. The method of manufacturing a battery module according to claim 8, wherein the elastic member, the two adjacent battery cells, and the cooling plate, form a space.

10. A battery module comprising:
    a plurality of battery cells;
    a cooling plate disposed over one side of the plurality of the battery cells, the cooling plate forming a first surface being flat and facing the one side of the plurality of the battery cells; and
    a thermal conductive member disposed between the one side of the plurality of the battery cells and the cooling plate,
    wherein the battery cell includes:
    an electrode assembly;
    an electrode tab being drawn from the electrode assembly; and
    a case surrounding the electrode assembly, the case including a pouch forming a close contact part on a single sheet of the pouch at the one side of the battery cell.

11. The battery module according to claim 10, wherein the battery cell includes a concave groove extending along a longitudinal direction of the close contact part.

12. The battery module according to claim 11, wherein the concave groove is concave towards the cooling plate.

13. The battery module according to claim 11, wherein the concave groove is convex towards the electrode assembly.

14. The battery module according to claim 10, wherein the thermal conductive member has adhesiveness and thermal conductivity.

15. The battery module according to claim 10, wherein the thermal conductive member is disposed between the close contact part and the cooling plate.

16. The battery module according to claim 10, wherein the thermal conductive member is disposed between the plurality of the battery cells and the cooling plate in a thin film form.

17. The battery module according to claim 10, wherein the case includes sealing parts formed by adhering the pouch at other three sides of the battery cells.

18. The battery module according to claim 17, wherein the close contact part is extending along a longitudinal direction of the battery cell, and wherein the electrode tab protrudes from the electrode assembly in the longitudinal direction.

19. The battery module according to claim 18, wherein the electrode tab is drawn to an outside of the sealing part.

20. The battery module according to claim 18, further comprising an elastic member disposed between two adjacent battery cells of the plurality of battery cells.

\* \* \* \* \*